United States Patent
Damie et al.

(10) Patent No.: US 6,200,527 B1
(45) Date of Patent: Mar. 13, 2001

(54) CARBON OR LOW-ALLOY STEEL WITH IMPROVED MACHINABILITY AND PROCESS OF MANUFACTURE OF THAT STEEL

(75) Inventors: Philippe Damie, Dunkerque; Christian Turrel, Loupian, both of (FR)

(73) Assignee: Ascometal, Puteaux (FR)

( * ) Notice: Subject to any disclaimer, the term of this patent is extended or adjusted under 35 U.S.C. 154(b) by 0 days.

(21) Appl. No.: 09/110,175

(22) Filed: Jul. 6, 1998

(30) Foreign Application Priority Data

Jul. 4, 1997 (FR) ................................................ 97 08449

(51) Int. Cl.$^7$ ............................ C22C 38/60; C22C 38/06
(52) U.S. Cl. ................................................ 420/84; 420/87
(58) Field of Search ............................................ 420/84, 87

(56) References Cited

U.S. PATENT DOCUMENTS

| | | | |
|---|---|---|---|
| 3,822,735 | 7/1974 | Miltenberger et al. | 164/475 |
| 3,861,906 | * 1/1975 | Tipnis et al. | 75/124 |
| 4,024,624 | 5/1977 | Bassett, Jr. et al. | 29/527.7 |
| 4,279,646 | * 7/1981 | Kato et al. | 75/123 AA |
| 4,468,249 | * 8/1984 | Lehman | 75/124 |

FOREIGN PATENT DOCUMENTS

| | | |
|---|---|---|
| 0 533 212A1 | 3/1993 | (EP) . |
| 2 212 432 | 7/1974 | (FR) . |
| 2 665 461 | 2/1992 | (FR) . |

* cited by examiner

*Primary Examiner*—Deborah Yee
(74) *Attorney, Agent, or Firm*—Oblon, Spivak, McClelland, Maier & Neustadt, P.C.

(57) ABSTRACT

A carbon or low-alloy steel is provided with improved machinability. The carbon content of the steel is less than 1.5% and the sum of the alloy elements contained therein is less than 9%. The steel contains oxide and sulfide inclusions, and the chemical composition of the steel includes $0.1\% \leq Mn$, $0.01\% \leq Al \leq 0.05\%$, $0.025\% \leq S \leq 0.3\%$, $0.002\% \leq Ca$, $O \leq 0.0015\%$ by weight; the "KO oxides" cleanness index is less than 30, all the oxides are lime aluminates, and the average calcium content of type 2, type 3, type 4 and type 5 inclusions is less than 30%. A process of manufacturing such steel and an oxide-core wire for its manufacture are also provided.

7 Claims, No Drawings

CARBON OR LOW-ALLOY STEEL WITH IMPROVED MACHINABILITY AND PROCESS OF MANUFACTURE OF THAT STEEL

BACKGROUND OF THE INVENTION

1. Field of the Invention

This invention concerns a fine-grained carbon or low-alloy steel that contains oxides and sulfides and is treated with calcium. The steel has improved machinability and is capable of being continuously cast.

2. Discussion of the Background

Carbon or low-alloy structural steels with improved machinability are well known. In these steels good machinability is obtained, notably, by the presence of relatively plastic sulfur-base inclusions and oxide inclusions having not too high a melting point, and by the absence of hard abrasive inclusions. The sulfur-base inclusions facilitate machining by favoring fragmentation of the machining cuttings, which is very desirable for low-speed machining operations such as boring. The oxide inclusions associated with calcium-rich manganese sulfides make it possible to carry out high-speed machinings by forming, on the surface of the tool which makes contact with the cutting, a layer ensuring both a lubricating function and a diffusion-barrier function which retards tool wear and makes it possible to obtain a good surface state. The absence of hard abrasive inclusions avoids tool wear caused by friction of such inclusions on the surface of the tool which makes contact with the cutting.

The sulfur-base inclusions consist of manganese sulfide, in which the sulfur can be partially substituted by selenium or tellurium, and the manganese can be partially substituted by calcium. Selenium, tellurium and calcium have the advantage of diminishing the high-temperature plasticity of manganese sulfides, which prevents the sulfur-base inclusions from becoming too elongated during high-temperature, plastic deformation shaping operations and from overly damaging the ductility of the metal. However, the calcium content of the sulfide inclusions should not be too high, because the mixed manganese and calcium sulfide inclusions may then become hard and abrasive. More precisely, the calcium content of the sulfide inclusions should be less than 75% and preferably less than 40%.

The oxide inclusions with not too high of a melting point are, notably, inclusions consisting of a lime aluminosilicate of suitable composition, in sufficient quantity and well dispersed. The oxide inclusions should not consist of pure alumina, an oxide that is, in fact, extremely hard and is found in steel in the form of very abrasive masses or alignments. In general, structural steels should contain a little aluminum to control the size of the grain and, therefore, they cannot contain pure silica inclusions, which moreover are undesirable.

The above-described steels, which are obtained by deoxidation with aluminum, resulfuration and injection with calcium or SICAL (SilicoCalciumAluminium), have a chemical composition characterized specifically by a sulfur content ranging between 0.025% and 0.3%, a manganese content exceeding 0.1%, an aluminum content ranging between 0.1% and 0.05%, an oxygen content exceeding 0.002% and a calcium content exceeding 0.002%. The rest of the composition is that of a standard carbon or low-alloy structural steel, that is, it includes of iron, carbon, alloy elements, nitrogen and impurities resulting from manufacture. Those steels can further contain supplementary addition elements, such as, for example, selenium, tellurium, bismuth or lead.

Beside the sulfur, manganese, aluminum, oxygen and calcium contents, steels with improved machinability are characterized by the nature and quantity of the inclusions. The nature of the inclusions corresponds to what has been defined above. The quantities are in direct relationship: sulfides with the sulfur content (and possibly selenium or tellurium content); and oxides with the oxygen content.

Even though they have a very good capacity for machining at both low speed and high speed, the above-identified steels inhere at least two disadvantages. First, they require a high oxygen content and consequently, a large quantity of oxide inclusions, which are unfavorable to fatigue strength. Second, they cannot be continuously cast. In fact, the injection of SICAL or calcium leads to the formation of oxides or sulfides which clog the casting nozzles. Furthermore, when the oxygen content is insufficient, the injection of calcium leads to the formation of calcium-rich sulfides, which are very hard and abrasive.

SUMMARY OF THE INVENTION

The purpose of the present invention is to solve the above-described problems by offering a carbon or low-alloy steel with improved machinability, treated with calcium, having a reduced oxygen content and capable of being continuously cast.

Accordingly, the first embodiment of the present invention relates to a carbon or low-alloy structural steel with improved machinability, with a carbon content of less than 1.5% and the sum of whose alloy elements is less than 9%, containing oxide and sulfide inclusions and having a chemical composition by weight of:

$0.1\% \leq Mn$ $0.01\% \leq Al \leq 0.05\%$ $0.025\% \leq S \leq 0.3\%$ $0.002\% \leq Ca$ $O \leq 0.0015\%$ the state of inclusion of that steel being characterized by a "KO oxides" cleanness index below 30, by the fact that all the oxide inclusions are lime aluminates and by an average calcium content of type 2, type 3, type 4 and type 5 inclusions below 30%, and preferably below 25%.

The second embodiment of the present invention relates to a process for the manufacture of a steel metallurgical product, including:

deoxidizing a molten steel with aluminum;

degassing the molten steel under vacuum;

injecting a powder that contains oxides whose melting temperature is below 1500° C. into the molten steel; and injecting calcium into the molten steel.

The third embodiment of the present invention relates to a core wire that contains an oxide powder having 50% to 70% $SiO_2$, 5% to 25% $Al_2O_3$, 5% to 25% CaO, 0% to 10% $Fe_2O_3$ and FeO, and a remainder being impurities.

DESCRIPTION OF THE PREFERRED EMBODIMENTS

Various other objects, features and attendant advantages of the present invention will be more fully appreciated as the same becomes better understood from the following detailed description, which is not intended to be limiting unless otherwise specified.

The steel preferably does not contain type 5 inclusions. The type 3 and 4 inclusions also preferably represent less than 30% of the inclusions. Finally, it is preferable for the proportion of type 2 inclusions to be greater than 20% and for the average calcium content of those inclusions to range between 15% and 25% calcium.

The steel can be manufactured in the form of a metallurgical product of continuously cast slab, bloom, billet, bar or wire type.

Preferably, the core wire includes a tube that is fusible in the molten steel and a powder being of a mixture of oxides having a melting temperature below 1500° C., more preferably below 1400° C. and most preferably below 1300° C.

The oxide powder for the core wire preferably contains 50% to 70% $SiO_2$, 5% to 25% $Al_2O_3$, 5% to 25% CaO, 0% to 10% $Fe_2O_3$ and FeO, the rest being impurities.

The oxide powder for the process preferably contains 50% to 70% $SiO_2$, 5% to 25% $Al_2O_3$, 5% to 25% CaO, 0% to 10% $Fe_2O_3$ and FeO, the rest being impurities, and its composition is chosen so that its melting temperature will be preferably below 1500° C., more preferably below 1400° C., and most preferably below 1300° C.

Preferably, the carbon or low-alloy structural steel with improved machinability of the present invention is intended mainly for the fabrication of machine parts obtained either by machining a steel bloom cut in a rolled steel product, or by machining a blank obtained by forging. The fabrication of these machine parts generally entails a heat treatment carried out on the part, or on a steel metallurgical product, or on the forged blank. The heat treatment may be completed by a surface treatment. The chemical composition of the structural steels used for machine parts may be chosen in accordance with the mechanical properties desired, the use envisaged for the parts, and the size of the parts. The range of composition possible for the steels of the present invention is very wide and is not strictly defined. Preferably, however, these steels generally contain:

- carbon, between 0% and 1.5%, and preferably between 0.1 and 1.0%;
- possibly at least one alloy element chosen among silicon, manganese, nickel, chromium and molybdenum (preferably replaced by tungsten), in quantities of less than 2% for silicon, 5% for manganese, 6% for nickel, 5% for chromium and 2% for molybdenum, the sum of those contents generally being less than 9%, and preferably less than 7%;
- possibly at least one microalloy element chosen among titanium, niobium and vanadium, in quantities of less than 1%, and possibly also boron, in quantities generally less than 0.002%. Beside the preferred, principal elements which define structural steels, the chemical composition contains:
- in general, aluminum, preferably in quantities less than 0.1%, more preferably less than 0.05%;
- possibly elements such as sulfur, tellurium, selenium, bismuth, lead or rare earths, intended to improve machinability; when they are present, those elements are generally in quantities of less than 0.3%, more preferably less than 0.15%;
- nitrogen, impurities and residues resulting from manufacture, particularly oxygen; the nitrogen content is generally less than 0.03%, more preferably less than 0.025%. The rest is iron, the content of which exceeds 90%, more preferably 92%.

Preferably, to manufacture the steel of the present invention, a raw molten steel is made in the converter or in the electric furnace and is then poured into a ladle. The standard ladle metallurgy operations are carried out in the ladle, intended notably to deoxidize the steel by addition of alumina, and to adjust the chemical composition by addition of ferroalloys. The molten steel is then degassed by treatment under vacuum, for example, by RH passage. The steel thus obtained, which is practically ready to be cast in order to obtain a solid semifinished product, is most preferably characterized, aside from its temperature and content of carbon and alloy or microalloy elements, by its oxygen, aluminum, sulfur and manganese contents.

The aluminum which, on the one hand, is in the form of aluminum dissolved in the steel and, on the other, in the form of alumina particles, is present in an amount ranging between 0.01% and 0.05%, more preferably between 0.015–0.03%.

The oxygen is most preferably combined with the aluminum in the particles of alumina. Its content is less than 0.0015%, and more preferably less than 0.001%. The oxygen content is particularly important, since it represents, in fact, the quantity of alumina particles present in the steel, and those particles have a very significant bearing on the properties of the steel.

The sulfur, dissolved in the molten steel in a quantity ranging between 0.025% and 0.3%, and more preferably between 0.03–0.2%, is intended to form in the solid steel sulfide inclusions of elements having a strong affinity for sulfur, such as manganese or calcium. Those inclusions are all the more numerous and, therefore, are effective in improving the machinability of the steel as the sulfur content is high. However, those inclusions are detrimental to certain mechanical properties of steel, such as ductility, which leads to limiting the sulfur content to values that are not too high, i.e., above 0.3%.

The manganese has several effects on the properties of the steel and, in particular, of being combined with the sulfur, as well as with other elements of the same family, e.g., with selenium or tellurium. Its content should be sufficient, when associated with other elements having a strong affinity for sulfur, so that all of the sulfur and elements of the same family are preferably present in the solid steel in the form of sulfide-type inclusions. The minimum manganese content should, for that purpose, exceed 0.1%, more preferably 0.15%.

The molten steel having the characteristics just described is not entirely ready to be cast. In fact, in order to obtain inclusions having the desired properties, namely, the absence of pure alumina, the presence of lime aluminates, the presence of mixed manganese and calcium sulfides containing less than 30%, and more preferably less than 25% calcium, the oxide inclusions preferably being associated with sulfides, and the sulfide inclusions preferably containing between 15% and 25% calcium, it is necessary to introduce calcium in the steel. Furthermore, the inventors discovered that, for calcium to be introduced under satisfactory conditions and to give the desired result, notably a sufficient quantity of oxide inclusions, the introduction of calcium had to be preceded by the introduction of suitably chosen oxide particles in the steel.

Before casting the steel, a mixture of silica, alumina, lime and iron oxides having a melting point below 1500° C., preferably below 1400° C., and most preferably below 1300° C. is introduced in the molten steel, and then calcium is introduced by any method known to the expert, e.g., by means of a core wire.

The chemical composition of the silica, alumina, lime and iron oxide mixture is preferably:

| | |
|---|---|
| $SiO_2$ | from 50% to 70%, more preferably approx. 60% |
| $Al_2O_3$ | from 5% to 25%, more preferably approx. 16% |
| CaO | from 5% to 25%, more preferably approx. 15% |
| $Fe_2O_3$ and FeO: | from 0% to 10%, more preferably approx. 6%. |

This mixture can additionally contain impurities and is preferably manufactured in the form of a powder mixture fritted at high temperature and contained in a mild steel tube, so as to have the form of a core wire.

The above mixture can advantageously be obtained with a mixture of approximately 40% fused clinker-base aluminous hydraulic cement and approximately 60% powdered quartz sand.

Preferably, once treated with calcium, the molten steel is cast, in order to be solidified in the form of semifinished products which are shaped by plastic deformation, e.g., by rolling or by forging, so as to obtain, as the case may be, either a steel metallurgical product or a forged blank. Casting can be done in an ingot mold, but it can also be done—and that is one of the major advantages of the invention—by continuous casting of billets, blooms or slabs.

The solid steel thus obtained contains alloy or microalloy elements characteristic of the grade of steel considered, but it also contains sulfur, on the one hand, and calcium and oxygen, on the other, all elements present in the form of inclusions. Surprisingly, the inventors discovered that, in spite of the introduction of the oxide mixture described above, the oxygen content was unaltered and remained below 0.0015%. Furthermore, the calcium content exceeds 0.002%, and more preferably 0.02% (that element, which is not very soluble in steel, is present essentially in the inclusions, and its average content in the steel rarely exceeds 0.1%). The chemical composition of the steel is therefore characterized by the following %contents:

$0.1\% \leq Mn$ $0.01\% \leq Al \leq 0.05\%$ $0.025\% \leq S \leq 0.3\%$ $0.002\% \leq Ca$ $O \leq 0.0015\%$ To characterize the state of inclusion of the steel, on the one hand, one determines a "KO oxides" index according to German standard SEP 1570-71 and, on the other, by means of an electron scanning microscope coupled with an image analyzer and a retrodiffused electron chemical analysis device (EDS), one determines by automatic counting the proportion of inclusions belonging to each of the following classes:

type 1: filiform sulfides,
type 2: globular sulfides,
type 3: sulfides containing one or more oxides,
type 4: sulfides and oxides paired,
type 5: oxides alone.

The average calcium content of the inclusions belonging to each of the above classes is also determined, the calcium content corresponding to the proportion of manganese which is substituted by calcium in the sulfides (value of x in the formula $Mn_{1-x}Ca_xS$). The count is made on a population of over 200 inclusions. The filiform sulfides are distinguished from the globular sulfides by their shape factor defined by the ratio of length L to width 1. For type 1, L/1 is more than 3, and for type 2, L/1 is less than 3.

The inclusion population of the steel obtained by the process according to the invention is such that:

the "KO oxides" index is less than 30,
all the oxide inclusions are lime aluminates,
the average calcium content of the type 2, type 3, type 4 and type 5 inclusions is less than 30% and more preferably less than 25% and generally ranges between 15% and 25%,
the average calcium content of the type 5 inclusions is less than 30%,
in general, over 75% of the oxide inclusions are associated with sulfide inclusions,
the average calcium content of the type 1 inclusions generally ranges between 1% and 2%.

It is to be noted that the compositions of the inclusions can be determined by electron microprobe or macroprobe analysis. These characteristics of the state of inclusion make it possible to obtain good machinability on high-speed machining, for example, on turning.

It is to be noted that the expert can easily distinguish products obtained by continuous casting from products obtained by ingot casting by making the standard metallographic examinations.

EXAMPLES

Having generally described this invention, a further understanding can be obtained by reference to certain specific examples which are provided herein for purposes of illustration only and are not intended to be limiting unless otherwise specified.

All the examples concern structural steels of 42CrMo4 and 39NiCrMo type according to European standard EN 10083.1 and a 27CrMo4 steel intended for automotive applications, the nominal compositions (average composition sought for the principal elements) of which are in % by weight:

|  | C | Si | Mn | Ni | Cr | Mo |
| --- | --- | --- | --- | --- | --- | --- |
| 42CrMo4 | 0.42 | 0.25 | 0.7 | — | 1 | 0.25 |
| 27CrMo4 | 0.27 | 0.25 | 0.7 | — | 1 | 0.25 |
| 39NiCrMo3 | 0.39 | 0.25 | 0.6 | 0.75 | 0.8 | 0.2 |

Those steels were manufactured by aiming at a sulfur content of approximately 0.03% and they were deoxidized with aluminum. The following castings were made:

AC, according to the invention (degassed, injection of an oxide-core wire, injection of calcium), continuous castings, BC, by way of comparison, degassed, with injection of calcium (without injection of oxide-core wire), continuous castings, AL, by way of comparison, not degassed, with injection of calcium (without injection of xide-core wire), ingot castings, CL, by way of comparison, degassed, without injection of calcium or of oxide-core wire, continuous castings.

Castings AC, BC and AL correspond to steels with improved machinability. The CL castings correspond to a standard steel, which does not have improved machinability.

All the castings, except for those which could not be satisfactorily poured in continuous casting, were hot-rolled to form disks approximately 100 mm in diameter, which were tempered and annealed to give them their properties of use. The aluminum, oxygen, sulfur and calcium contents were then determined, the state of inclusion was characterized and turning machinability was evaluated by measurement of the V20B0.3 index (according to standard ISO 3685), giving index 100 to the CL castings for machinability.

The following results were obtained:

conditions of casting and chemical analysis (in % by weight):

|  | Continuous Casting | Ingot | Al | Ca | S | O |
| --- | --- | --- | --- | --- | --- | --- |
| AC | good | — | 0.014 | 0.0025 | 0.031 | 0.0007 |
| AL | — | good | 0.011 | 0.0024 | 0.026 | 0.0022 |
| BC | poor | — | 0.015 | 0.0020 | 0.027 | 0.0006 |
| CL | good | — | 0.013 | — | 0.029 | 0.0012 | state of inclusion and machinability:

| | Nature of Oxides | KO oxides | type 1 % nb | type 1 % Ca | type 2 % nb | type 2 % Ca | type 3 % nb | type 3 % Ca | type 4 % nb | type 4 % Ca | type 5 % nb | type 5 % Ca | V20 B0.3 |
|---|---|---|---|---|---|---|---|---|---|---|---|---|---|
| AC | lime aluminates | 10 | 30 | 1.3 | 45 | 20 | 11 | 18 | 14 | 25 | 0 | 0 | 151 |
| BC | lime aluminates | 18 | 42 | 2.3 | 38 | 31 | 4 | 30 | 16 | 46 | 0 | 0 | 113 |
| AL | lime aluminates | 60 | 9 | 0.3 | 20 | 13 | 11 | 22 | 60 | 33 | 0 | 0 | 130 |
| CL | aluminas | 10.5 | 54 | 0.2 | 0 | 0 | 6 | 0.3 | 8 | 0.2 | 32 | 0.1 | 100 |

(% nb designates the % by number of inclusions)

Those results clearly show that:

the steel according to the invention can be continuously cast, while a similar steel, degassed and treated with calcium without injection of oxide-core wire (BC castings) poses problems for those castings; in fact, the continuous casting was hampered by clogging of nozzles;

the steel according to the invention (AC castings) shows better machinability than the steels with improved machinability not degassed according to the prior art (AL castings), in spite of a very appreciably lower lime aluminate content and a lower "KO oxides" index.

Having now fully described the invention, it will be apparent to one of ordinary skill in the art that many changes and modifications can be made thereto without departing from the spirit or scope of the invention as set forth herein.

This application is based on French Patent Application No. 97 08449, filed Jul. 4, 1997, the entire contents of which are hereby incorporated by reference.

What is claimed as new and desired to be secured by Letters Patent of the United States is:

1. A carbon or low-alloy steel, comprising;
   a carbon content of less than 1.5% by weight,
   alloy elements in a combined amount of less than 9% by weight,
   oxide and sulfide inclusions,
   wherein the chemical composition of the steel comprises, by weight:
   $0.1\% \leq Mn \leq 5\%$
   $0.01\% \leq Al \leq 0.05\%$
   $0.025\% \leq S \leq 0.3\%$
   $0.002\% \leq Ca \leq 0.1\%$
   $O \leq 0.0015\%$
   wherein a "DO oxide" cleanness index is below 30, the oxide inclusions are lime aluminates, and an average calcium content of type 2, type 3, type 4 and type 5 inclusions is less than 30% of the inclusions.

2. The steel according to claim 1, wherein it does not contain type 5 inclusions.

3. The steel according to claim 1, wherein the number of type 3 and type 4 inclusions constitute less than 30% of the total number of inclusions.

4. The steel according to claim 1, wherein the number of type 2 inclusions is greater than 30% of the total number of inclusions and wherein the average calcium content of the type 2 inclusions is between 15% and 25%.

5. A steel metallurgical product selected from the group consisting of slab, bloom, billet, bar and wire, comprising the steel according to claim 1.

6. The steel metallurgical product according to claim 5, wherein said product is made by continuous casting.

7. The steel according to claim 1, wherein the chemical composition of the steel comprises, by weight:
   $0.02\% \leq Ca \leq 0.1\%$.

* * * * *